United States Patent

Blum et al.

[11] Patent Number: 5,558,377
[45] Date of Patent: Sep. 24, 1996

[54] TELESCOPING CLIP IMPLEMENT

[76] Inventors: Robert Blum; George McKeon, both of 4690 Bradley Ct., Doylestown, Pa. 18901

[21] Appl. No.: 438,085

[22] Filed: May 8, 1995

[51] Int. Cl.$^6$ ........................................ B25J 1/02
[52] U.S. Cl. ............................................. 294/19.1
[58] Field of Search .................... 294/19.1–19.3, 294/24, 65.5, 99.1, 902; 16/110.5, 115; 81/177.4, 490; 368/278, 284

[56] References Cited

U.S. PATENT DOCUMENTS

| | | | |
|---|---|---|---|
| 504,166 | 8/1893 | Kroll | 294/19.3 X |
| 580,896 | 4/1897 | Quackenbush | 294/19.1 |
| 1,208,624 | 12/1916 | Newman | 294/19.1 X |
| 1,587,647 | 6/1926 | Hood et al | 81/177.4 X |
| 1,755,646 | 4/1930 | Halstead | 294/19.1 X |
| 2,577,651 | 12/1951 | Dewey | 81/177.4 |
| 3,384,408 | 5/1968 | Furzey | 294/65.5 |
| 3,756,096 | 9/1973 | Bolden | 294/19.1 X |
| 4,382,687 | 5/1983 | Lemelson | 368/284 X |
| 4,953,905 | 9/1990 | Cohen | 294/19.1 |
| 5,188,332 | 2/1993 | Callas | 294/19.1 X |

Primary Examiner—Johnny D. Cherry

[57] ABSTRACT

An implement for coupling to and effecting remote manual manipulation of an object. The inventive device includes a handle tube having a plurality of extension tubes telescopingly received within the handle tube. An engaging clip is secured to an outermost extension tube for engaging an object for manipulation by an individual holding the handle tube.

5 Claims, 3 Drawing Sheets

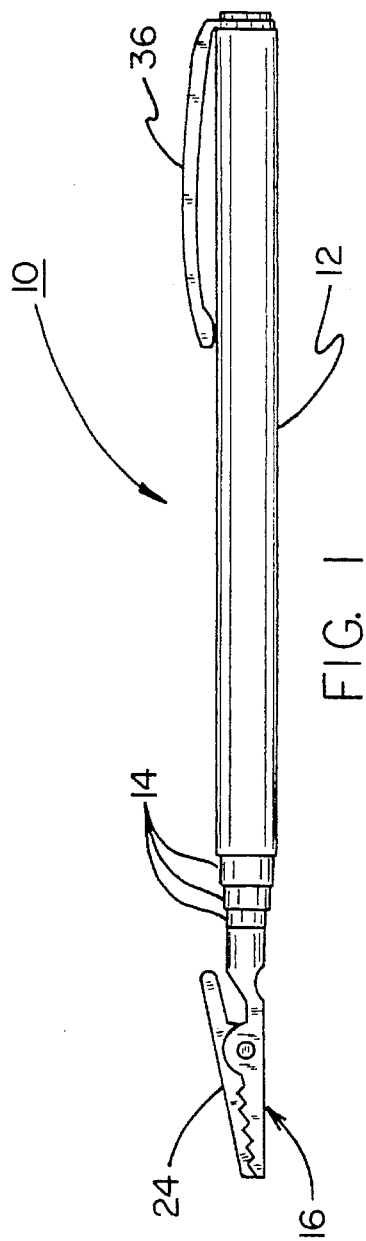
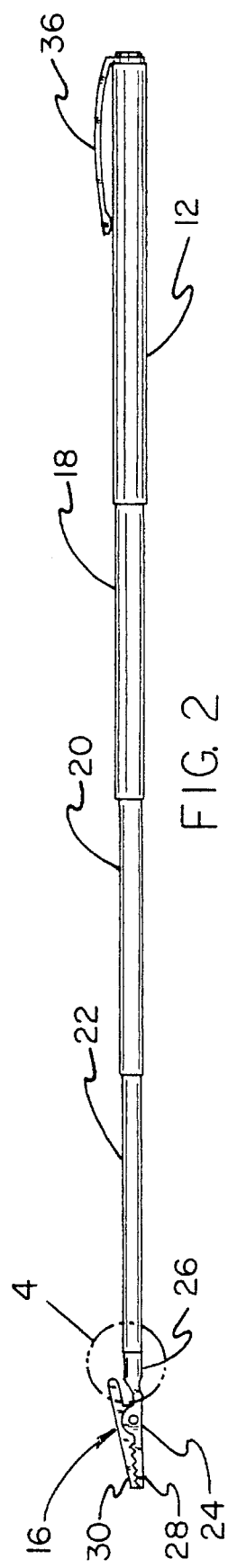

TELESCOPING CLIP IMPLEMENT

BACKGROUND OF THE INVENTION

1. Field of the Invention

The present invention relates to implement structures and more particularly pertains to an telescoping clip implement for coupling to and effecting remote manual manipulation of an object.

2. Description of the Prior Art

The use of implement structures is known in the prior art. More specifically, implement structures heretofore devised and utilized are known to consist basically of familiar, expected and obvious structural configurations, notwithstanding the myriad of designs encompassed by the crowded prior art which have been developed for the fulfillment of countless objectives and requirements.

Known prior art implement structures include Design U.S. Pat. Nos. 251,620; 285,362; 311,600; and 325,515.

While these devices fulfill their respective, particular objectives and requirements, the aforementioned patents do not disclose a telescoping clip implement for coupling to and effecting remote manual manipulation of an object which includes a handle tube having a plurality of extension tubes telescopingly received therewithin, and an engaging clip secured to an outermost extension tube for engaging an object for manipulation thereof by an individual holding the handle tube.

In these respects, the telescoping clip implement according to the present invention substantially departs from the conventional concepts and designs of the prior art, and in so doing provides an apparatus primarily developed for the purpose of coupling to and effecting remote manual manipulation of an object.

SUMMARY OF THE INVENTION

In view of the foregoing disadvantages inherent in the known types of implement structures now present in the prior art, the present invention provides a new telescoping clip implement construction wherein the same can be utilized for coupling to and effecting remote manual manipulation of an object. As such, the general purpose of the present invention, which will be described subsequently in greater detail, is to provide a new telescoping clip implement apparatus and method which has many of the advantages of the implement structures mentioned heretofore and many novel features that result in a telescoping clip implement which is not anticipated, rendered obvious, suggested, or even implied by any of the prior art implement structures, either alone or in any combination thereof.

To attain this, the present invention generally comprises an implement for coupling to and effecting remote manual manipulation of an object. The inventive device includes a handle tube having a plurality of extension tubes telescopingly received within the handle tube. An engaging clip is secured to an outermost extension tube for engaging an object for manipulation by an individual holding the handle tube.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new telescoping clip implement apparatus and method which has many of the advantages of the implement structures mentioned heretofore and many novel features that result in a telescoping clip implement which is not anticipated, rendered obvious, suggested, or even implied by any of the prior art implement structures, either alone or in any combination thereof.

It is another object of the present invention to provide a new telescoping clip implement which may be easily and efficiently manufactured and marketed.

It is a further object of the present invention to provide a new telescoping clip implement which is of a durable and reliable construction.

An even further object of the present invention is to provide a new telescoping clip implement which is susceptible of a low cost of manufacture with regard to both materials and labor, and which accordingly is then susceptible of low prices of sale to the consuming public, thereby making such telescoping clip implements economically available to the buying public.

Still yet another object of the present invention is to provide a new telescoping clip implement which provides in the apparatuses and methods of the prior art some of the advantages thereof, while simultaneously overcoming some of the disadvantages normally associated therewith.

Still another object of the present invention is to provide a new telescoping clip implement for coupling to and effecting manual manipulation of an object.

Yet another object of the present invention is to provide a new telescoping clip implement which includes a handle tube having a plurality of extension tubes telescopingly received therewithin, and an engaging clip secured to an outermost extension tube for engaging an object for manipulation thereof by an individual holding the handle tube.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an elevation view of a telescoping clip implement according to the present invention in a compacted position.

FIG. 2 is an elevation view of the invention in an extended position.

DESCRIPTION OF THE PREFERRED EMBODIMENT

Figure 3:
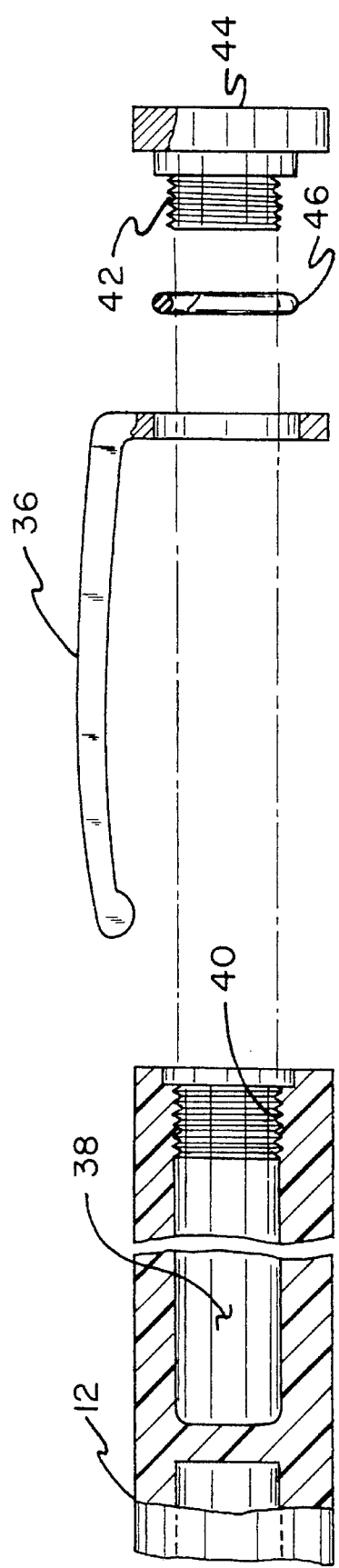
FIG. 3 is an exploded side elevation view, partially in cross section, of a portion of the present invention.

With reference now to the drawings, and in particular to FIGS. 1–6 thereof, a new telescoping clip implement embodying the principles and concepts of the present invention and generally designated by the reference numeral 10 will be described.

More specifically, it will be noted that the telescoping clip implement 10 comprises an elongated handle tube 12 symmetrically oriented about a longitudinal axis directed therethrough. A plurality of extension tubes 14 are telescopingly received within the handle tube 12 and can be selectively extended therefrom as shown in FIG. 2 into an extended position. An engaging means 16 is mounted to an outermost one of the extension tubes 14 for engaging an object so as to permit manual manipulation of the object by an individual holding the handle tube 12.

As shown in FIG. 2, the handle tube 12 is of a first diameter, with the extension tubes 14 each being of a diameter substantially less than the first diameter of the handle tube 12. The plurality of extension tubes 14 includes a first extension tube 18 slidably received within the handle tube 12 and extendable therefrom, a second extension tube 20 slidably received within the first extension tube 18 and slidable therefrom, and a third extension tube 22 which is similarly received within the second extension tube 20 and can be slidably extended therefrom. The extension tubes 14 are configured such that frictional engagement between the respective tubes and between the handle tube 12 and the first extension tube 18 operates to retain the device 10 in the extended positioned illustrated in FIG. 2. By this structure, the extension tubes 14 can be slidably positioned within the handle tube 12 in a telescoping fashion so as to permit compacting of the device into the configuration illustrated in FIG. 1 for storage and/or transportation purposes.

With continuing reference to FIGS. 1 and 2, it can be shown that the engaging means 16 according to the present invention 10 preferably comprises a spring clip 24 including a mounting boss 26 secured to a free distal end of the third extension tube 22. The spring clip 24 further includes a first jaw 28 extending from the mounting boss 26, and a second jaw 30 pivotally mounted relative to the first jaw 28. An unillustrated spring is interposed between the first and second jaws 28 and 30 so as to bias the jaws into the closed configuration illustrated in the drawings, whereby an object can be selectively positioned between the jaws for retention thereof relative to the engaging means 16. By this structure, an object can be easily coupled to the engaging means 16 such that manual manipulation of the object from a remote location can be accomplished through a manipulation of the handle tube 12 with the extension tubes 14 in the compacted configuration illustrated in FIG. 1 or the semi-configuration illustrated in FIG. 2.

Figure 4:
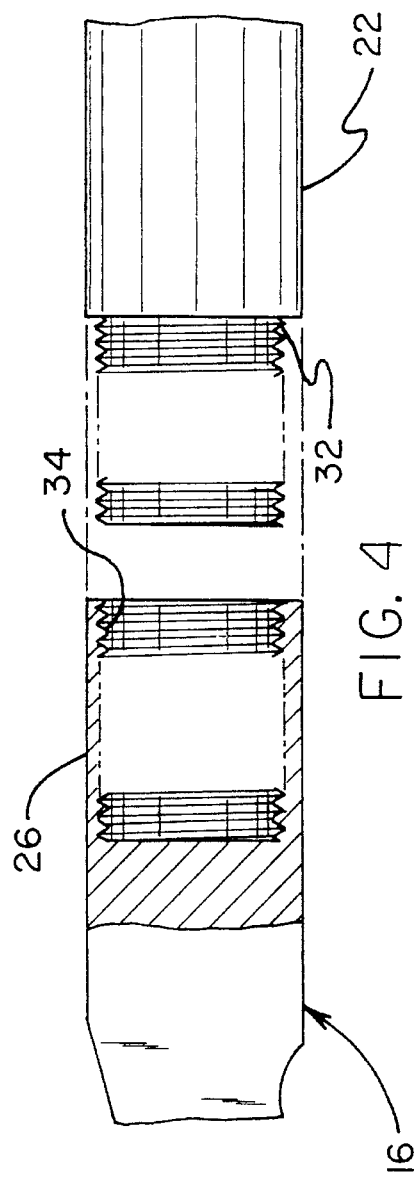
FIG. 4 is an exploded elevation view, partially in cross section, of a further portion of the present invention.

As shown in FIG. 4, the free distal end of the third extension tube 22 is shaped so as to define an extension tube threaded projection 32 which is threadably received within a bore of the mounting boss 26 of the engaging means 16. To this end, an inter±or of the bore directed into the mounting boss 26 includes mounting boss interior threads 34 which receive and threadably engage the extension tube threaded projection 32 as shown in FIG. 4.

Referring now to FIG. 3, it can be shown that the present invention 10 may further comprise a securing clip 36 extending at least partially along an exterior surface of the handle tube 12. The securing clip 36 operates to engage an article of clothing or other planar object or web so as to selectively couple the device 10 relative thereto for storage and/or transportation purposes. With continuing reference to FIG. 3, it can be shown that the handle tube 12 may be shaped so as to define a closed storage cavity 38 extending into a first end thereof. The storage cavity 38, proximal to the first end of the first end of the handle tube 12, may be shaped so to define a plurality of handle tube interior threads 40 which receive an end cap threaded plug 42 coupled to an end cap 44 so as to effect selective closing of the storage cavity 38. A seal 46 can be interposed between the end cap 44 and the first end of the handle tube 12 so as to preclude an entrance of fluids into the storage cavity 38 during immersion of the device 10. Preferably, the securing clip 36 is interposed between the end cap 44 and the first end of the handle tube 12 so as to mount the securing clip 36 in the orientation illustrated in FIGS. 1 and 2 of the drawings.

Figure 5:
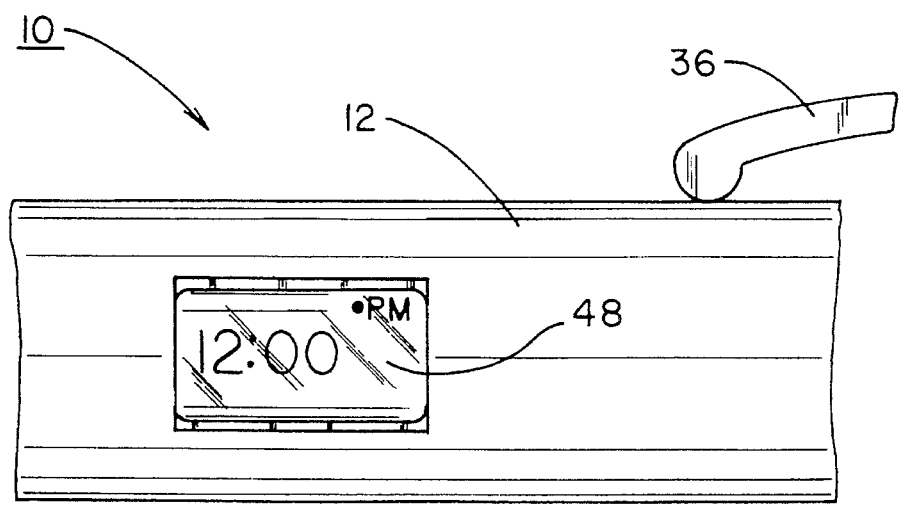
FIG. 5 is an enlarged elevation view of the present invention including a digital clock.

As shown in FIG. 5, the present invention 10 may further comprise a digital clock 48 of conventionally known design mounted along an exterior of the handle tube 12. If deemed necessary during the construction of the device 10, the handle tube 12 may be constructed of a length necessary to facilitate or provide room within the handle tube 12 for both the electronic components of the digital clock 48 and the first extension tube 18 therewithin.

Figure 6:
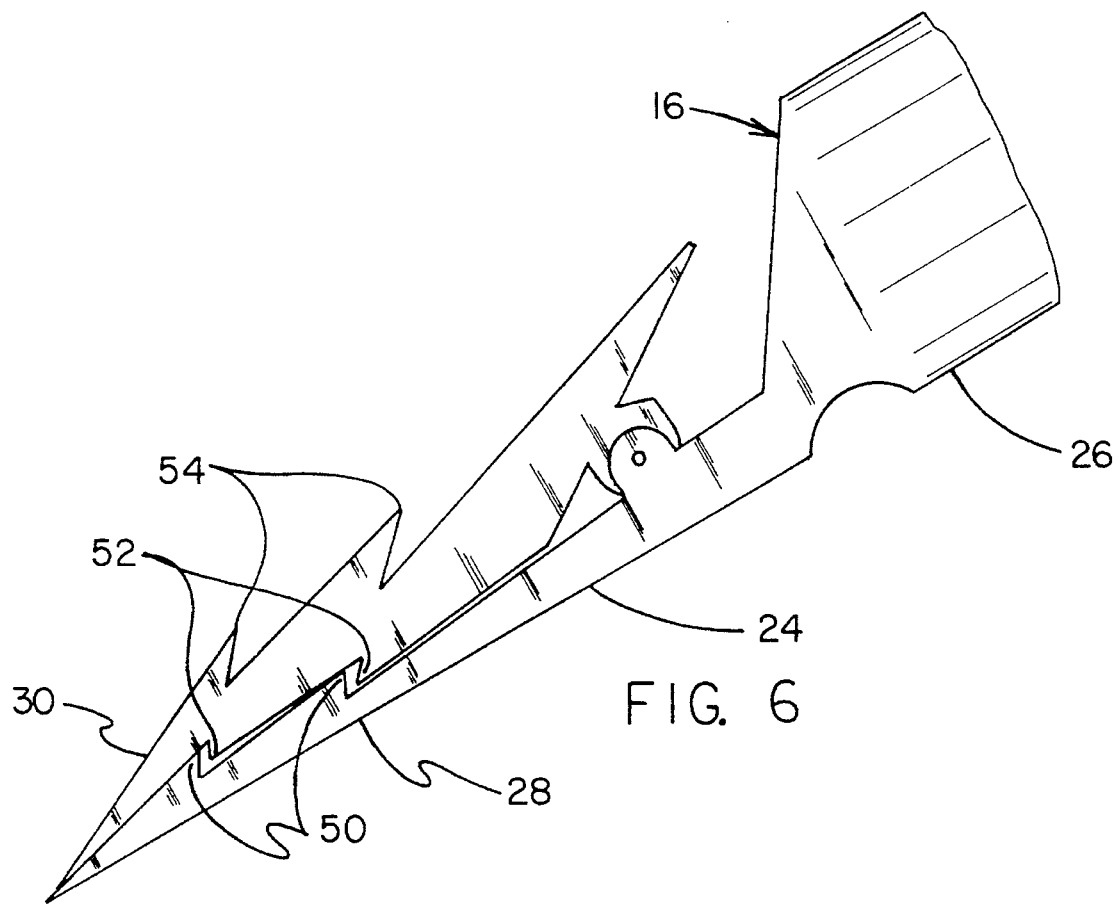
FIG. 6 is an enlarged elevation view of an alternative form of an engaging means of the present invention.

Referring now to FIG. 6, it can be shown that the first jaw 28 of the engaging means 16 may be desirably shaped so as to include a plurality of first jaw angled projections 50 extending towards the mounting boss 26. The second jaw 30 may be similarly shaped so as to include a plurality of second jaw lower angled lower projections 52 projecting away from the mounting boss 26 and into the first jaw angled projections 50. Further, the second jaw 30 may be further shaped so as to define a plurality of second jaw upper angled projections 54 projecting towards the mounting boss 26 substantially as shown in the drawings. By this structure, the first jaw angled projections 50 cooperate with the second jaw lower angled projections 52 so as to retain an object between the first jaw 28 and the second jaw 30. Further, the second jaw upper angled projections 54 operate to permit the device 10 to be utilized as a grapple, wherein the second jaw upper angled projections can be utilized to snap or loosely engage an object from a remote location by an individual manipulating the handle tube In use, the telescoping clip implement 10 according to the present invention can be easily utilized to effect remote manual manipulation of an object coupled to the engaging means 16. The storage cavity 38 within the handle tube 12 can be utilized to store small items in a secret or concealed manner. The releasable coupling of the engaging means 16 to the free distal end of the third extension tube 22 permits an interchanging of the engaging means 16 as desired by a user. Further, the digital clock 48 mounted to the exterior of the handle tube 12 permits an individual to readily ascertain a time and/or date as needed.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, forms, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A telescoping clip implement comprising:

an elongated handle tube symmetrically oriented about a longitudinal axis directed therethrough, wherein the handle tube is shaped so as to define a closed storage cavity extending into a first end thereof, the storage cavity being shaped so as to define a plurality of handle tube interior threads; and an end cap having an end cap threaded plug threadably engaged to the handle tube interior threads;

a plurality of extension tubes telescopingly received within the handle tube which can be selectively extended therefrom into an extended position, said handle tube being of a first diameter with the extension tubes each being of a diameter substantially less than the first diameter of the handle tube and wherein the plurality of extension tubes includes a first extension tube slidably received within the handle tube and extendable therefrom, a second extension tube slidably received within the first extension tube and slidable therefrom, and a third extension tube slidably received within the second extension tube and slidably extendable therefrom, a free distal end of the third extension tube being shaped so as to define an extension tube threaded projection; and an engaging means mounted to the free distal end of the third extension tube for engaging an object so as to permit manual manipulation of the object by an individual when holding the handle tube, said engaging means comprising a spring clip including a mounting boss secured to the free distal end of the third extension tube; a first mounting jaw extending from the mounting boss; and a second jaw pivotally mounted relative to the first jaw wherein the mounting boss includes a threaded bore with the extension tube threaded protection being threadably received within the bore of the mounting boss.

2. The telescoping clip implement of claim 1, and further comprising a securing clip interposed between the end cap and the first end of the handle tube.

3. The telescoping clip implement of claim 2, and further comprising a digital clock mounted along an exterior of the handle tube.

4. The telescoping clip implement of claim 3, wherein the first jaw of the engaging means is shaped so as to include a plurality of first jaw angled projections extending towards the mounting boss, with the second jaw being shaped so as to include a plurality of second jaw lower angled lower projections projecting away from the mounting boss and into the first jaw angled projections, the second jaw being further shaped so as to define a plurality of second jaw upper angled projections projecting towards the mounting boss.

5. The telescoping clip implement of claim 7, wherein said first jaw of the engaging means is shaped so as to include a plurality of first jaw angled projections extending towards the mounting boss, with said second jaw of said engaging means being shaped so as to include a plurality of second jaw lower angled lower projections projecting away from the mounting boss and into the first jaw angled projections, the second jaw being further shaped so as to define a plurality of second jaw upper angled projections projecting towards the mounting boss.

* * * * *